US012764042B2

(12) United States Patent
Martin De Nicolas et al.

(10) Patent No.: US 12,764,042 B2
(45) Date of Patent: Oct. 13, 2026

(54) VERSION-DEPENDENCY INFORMATION FOR MANAGEMENT OF A NETWORK SERVICE

(71) Applicant: Telefonaktiebolaget LM Ericsson (publ), Stockholm (SE)

(72) Inventors: Arturo Martin De Nicolas, Brussels (BE); Cristina Badulescu, Roxboro (CA); Joerg Aelken, Eynatten (BE); Bryan O'Looney, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/836,179

(22) PCT Filed: Feb. 7, 2022

(86) PCT No.: PCT/EP2022/052870
§ 371 (c)(1),
(2) Date: Aug. 6, 2024

(87) PCT Pub. No.: WO2023/147882
PCT Pub. Date: Aug. 10, 2023

(65) Prior Publication Data

US 2025/0132992 A1 Apr. 24, 2025

(51) Int. Cl.

| | |
|---|---|
| ***G06F 15/173*** | (2006.01) |
| ***G06F 8/65*** | (2018.01) |
| ***H04L 41/0895*** | (2022.01) |
| ***H04L 41/40*** | (2022.01) |
| ***H04L 41/5054*** | (2022.01) |

(52) U.S. Cl.
CPC ............ *H04L 41/5054* (2013.01); *G06F 8/65* (2013.01); *H04L 41/0895* (2022.05); *H04L 41/40* (2022.05)

(58) Field of Classification Search
CPC .... H04L 41/0895; H04L 41/40; H04L 41/342
See application file for complete search history.

(56) References Cited

U.S. PATENT DOCUMENTS

2015/0143355 A1* 5/2015 Tingstrom .............. H04L 67/10 717/170
2018/0316559 A1* 11/2018 Thulasi ............... H04L 41/0895
2018/0324261 A1* 11/2018 Yi ........................... H04L 67/51
2020/0313969 A1* 10/2020 Li ....................... H04L 41/0806

FOREIGN PATENT DOCUMENTS

EP 3 094 049 A1 11/2016

OTHER PUBLICATIONS

International Search Report and Written Opinion mailed Sep. 28, 2022 in corresponding International Application No. PCT/EP2022/052870 (9 pages).

* cited by examiner

*Primary Examiner* — Padma Mundur
(74) *Attorney, Agent, or Firm* — Rothwell, Figg, Ernst & Manbeck, P.C.

(57) ABSTRACT

A descriptor of a network service is determined. The descriptor may be used for controlling management of a network service, such as instantiation or updating of the network service. The descriptor comprises multiple constituents. Further, the descriptor is provided with information on version dependency between at least two of the multiple constituents.

15 Claims, 9 Drawing Sheets

| **VersionDependency** | | |
|---|---|---|
| Attribute | Cardinality | Content |
| dependentConstituentId | 1 | descriptor identifier |
| versionDependencyStatement | 1..N | version dependency statement(s) |

FIG. 5A

| **VersionDependencyStatement** | | |
|---|---|---|
| Attribute | Cardinality | Content |
| descriptorId | 1..N | descriptor identifier(s) |

FIG. 5B

| **Profile** | | |
|---|---|---|
| Attribute | Cardinality | Content |
| versionDependency | 0..N | version dependency/dependencies |

FIG. 5C

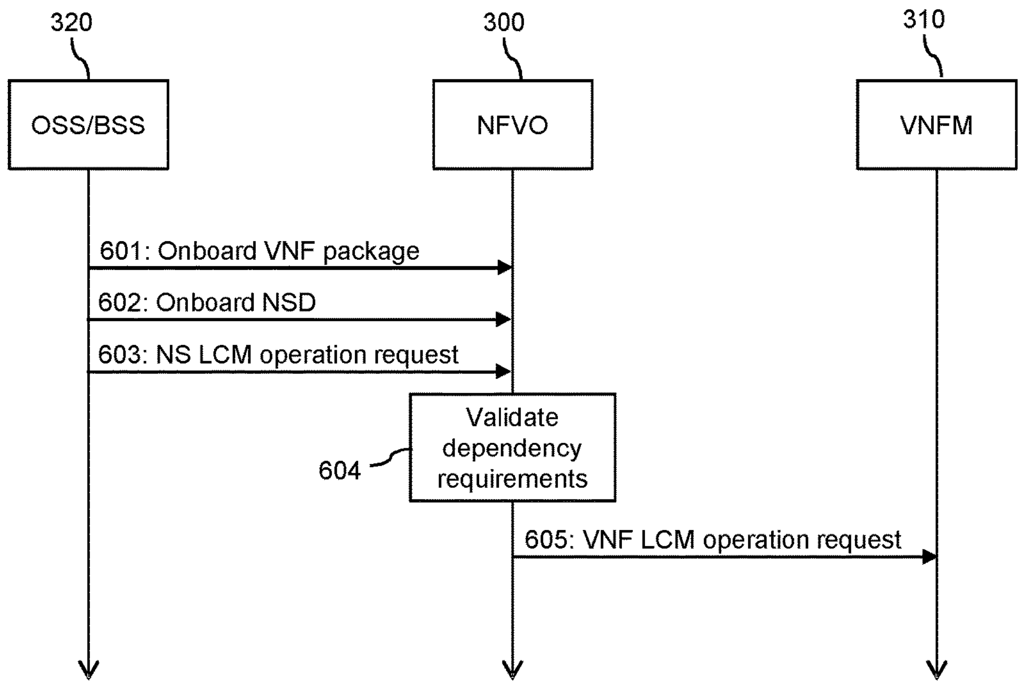

FIG. 6

```
Instantiate NS (nsdId: nnn_2.0, additionalParamForVnf(overridingVnfdId = ccc_1.1))
```

FIG. 8A

```
Instantiate NS (
  nsdId: nnn_2.0,
  additionalParamForVnf (
      overridingVnfdId = ccc_3.0
      overridingVersionDependency (
         profileId = aaa_2.0
         versionDependency (
            dependentConstituentId = aaa_2.0
            versionDependencyStatement (descriptorId = ccc_2.0, ccc_1.5, ccc_3.0)
            versionDependencyStatement (descriptorId = bbb_2.0)
         )
      )
   )
)
```

FIG. 8B

```
Instantiate NS (
  nsdId: nnn_2.0,
  additionalParamForVnf (overridingVnfdId = aaa_3.0)
  additionalParamForVnf (
      overridingVnfdId = ccc_3.0
      overridingVersionDependency (
          profileId = aaa_2.0
          versionDependency (
             dependentConstituentId = aaa_3.0
             versionDependencyStatement (descriptorId = ccc_2.0, ccc_1.5, ccc_3.0)
             versionDependencyStatement (descriptorId = bbb_2.0)
          )
      )
      overridingVersionDependency (
          profileId = aaa_2.0
          versionDependency (
             dependentConstituentId = aaa_2.0
             versionDependencyStatement (descriptorId = ccc_2.0, ccc_1.5, ccc_3.0)
             versionDependencyStatement (descriptorId = bbb_2.0)
          )
      )
  )
)
```

FIG. 8C

```
Update NS (
   nsdId: nnn_2.0,
   updateType: CHANGE_VNFPK
   changeVnfPackageData (
     vnfInstanceId: <id of the VNF instance>
     vnfdId=ccc_3.0
     overridingVersionDependencies (
       profileId = aaa_2.0
       versionDependency (
          dependentConstituentId = aaa_2.0
          versionDependencyStatement (descriptorId = ccc_2.0, ccc_1.5, ccc_3.0)
          versionDependencyStatement (descriptorId = bbb_2.0)
       )
     )
   )
)
```

FIG. 9

VERSION-DEPENDENCY INFORMATION FOR MANAGEMENT OF A NETWORK SERVICE

CROSS REFERENCE TO RELATED APPLICATION(S)

This application is a 35 U.S.C. § 371 National Stage of International Patent Application No. PCT/EP2022/052870, filed Feb. 7, 2022, designating the United States.

TECHNICAL FIELD

The present invention relates to methods for management of a network service and to corresponding devices, systems, and computer programs.

BACKGROUND

Management of a communication network is a rather complex task. In view of this situation, it is to provide functionalities which assist operators in management of the communication network and may also allow for at least partially automating management tasks. For this reason, network automation is an important aspect of future network development, e.g., in 6G ($6^{th}$ Generation) mobile network evolution.

In network automation, management entities and/or orchestration entities may operate autonomously based on various design time data that guide the orchestration behavior and processes and/or runtime and context information. Network automation, in particular in view of orchestration, is for example addressed by standards like ETSI NFV (see, e.g., ETSI GS NFV IFA 010 V4.2.1 (2021 May), ETSI GS NFV-IFA 014 V4.2.1 (2021 June), ETSI GS NFV-IFA 013 V4.2.1 (2021 May), ETSI GS NFV-IFA 007 V4.2.1 (2021 May), and ETSI GS NFV-SOL 001 V4.2.1 (2022 January)), ONAP (see, e.g., ONAP Guilin Maintenance Release 7.0.1 (2021 April)), or O-RAN (see, e.g., O-RAN O2 General Aspects and Principles Specification 1.01 (2021 June)).

The ETSI NFV framework, in the following also shortly denoted as NFV framework, is an orchestration and management technology having widespread acceptance and support in the telecom industry and defines an architecture for orchestration and life-cycle management (LCM) of virtualized networks and virtualized network function (VNF) applications. This architecture is typically referred to as the ETSI NFV-MANO architecture (MANO: Management and Orchestration). In the ETSI NVF-MANO architecture, an entity denoted as NFV Orchestrator (NFVO) exposes a NSD (Network Service Descriptor) management interface that allows consumers, e.g., OSS/BSS (Operations Support System/Business Support System), to perform onboarding of NSDs. The NFVO also exposes a VNF package interface that allows consumers to perform onboarding of VNF Descriptors (VNFDs). An entity denoted as VNFM (VNF Manager) is responsible for LCM of VNFs and exposes a VNF LCM interface.

The NSD is a deployment template which consists of information used by the NFVO for life cycle management of an NS (Network Service). Usually, an NSD contains VNFDs as one of its constituents. Other possible constituents of a NSD are nested NSDs and PNFDs (Physical Network Function Descriptors).

Further, the NFVO exposes an NS LCM interface that allows the NS LCM operations like instantiation, updating, scaling, and/or termination of an NS. To perform such NS LCM operations, the NFVO may invoke VNF LCM operations, exposed by the VNFM in the VNF LCM interface. The NFVO may also be a consumer of an NS LCM interface exposed by another NFVO, if a nested NS is managed by a separate NFVO.

In the NFV framework, constituents of the NSD are uniquely identified by an identifier. VNFDs are uniquely identified by a VNFD identifier. Any change in the VNFD, or in another component of the VNF package, results in a different VNFD identifier. Similarly, NSDs are uniquely identified with an NSD identifier, and PNFDs are uniquely identified by an PNFD identifier.

A more recent enhancement of the NFV framework allows, upon certain conditions, to use a different version of an NSD constituent. Accordingly, if the NSD specifies a certain version of a VNFD, a certain version of a nested NSD, or a certain version of a PNFD, it may be allowed to use another version of that constituent. Such other version of the constituent then also has another identifier. The allowed different version is indicated via the NS LCM interface, e.g., by a consumer of the interface like OSS/BSS, and the allowed different version overrides the one in the NSD. Accordingly, the allowed different version may also be referred to as overriding version. A condition upon which such overriding is allowed is that the overriding version of the constituent maintains external invariance. This means that the overriding version has the same external connectivity and exposes the same attributes as the originally specified version. Such NSDs in which certain constituents are substituted by another version, may for example be used to provide different deployment flavors of the NS.

The above condition of maintaining external invariance is controlled by an ExtInvariantId attribute in the respective constituent, e.g., in a VNFD, NSD, or PNFD. The ExtInvariantId attribute can optionally be provided in addition to the unique identifier of the constituent. For example, if two VNFDs have the same ExtInvariantId, this indicates external invariance of these VNFDs and that these VNFDs are suitable for the overriding and substitution as described above. In this way, it can be avoided that an NSD needs to be updated each time when one of its constituents is modified.

In some situations, the above-way of substituting another version of an NSD constituent may still result in problems, in particular if there is a certain functional dependency among the NSD constituents. In particular, it may occur that such functional dependency exists with respect to a specific version of the constituent. Substituting this specific version with another version may then have the effect that the functional dependency is no longer satisfied. Similarly, when substituting one version of a constituent with another version, the substituted version may have different functional dependencies on one or more other constituents of the NSD, which are however not met.

Accordingly, there is a need for efficiently managing a network service having multiple constituents, in particular with respect to possible substitution of a constituent by another version.

SUMMARY

According to an embodiment, a method of managing a network service is provided. According to the method, a descriptor of a network service is determined. The descriptor comprises multiple constituents. Further, the descriptor is provided with information on version dependency between at least two of the multiple constituents.

According to a further embodiment, a node for a communication network is provided. The node is configured to determine a descriptor of a network service. The descriptor comprises multiple constituents. Further, the node is configured to provide the descriptor with information on version dependency between at least two of the multiple constituents.

According to a further embodiment, a node for a communication network is provided. The node comprises at least one processor and a memory. The memory contains instructions executable by said at least one processor, whereby the node is operative to determine a descriptor of a network service. The descriptor comprises multiple constituents. Further, the memory contains instructions executable by said at least one processor, whereby the node is operative to provide the descriptor with information on version dependency between at least two of the multiple constituents.

According to a further embodiment of the invention, a computer program or computer program product is provided, e.g., in the form of a non-transitory storage medium, which comprises program code to be executed by at least one processor of a node for a communication network. Execution of the program code causes the node to determine a descriptor of a network service.

The descriptor comprises multiple constituents. Further, execution of the program code causes the node to provide the descriptor with information on version dependency between at least two of the multiple constituents.

Details of such embodiments and further embodiments will be apparent from the following detailed description of embodiments.

BRIEF DESCRIPTION OF THE DRAWINGS

FIGS. 5A, 5B, and 5C schematically illustrate information elements for indicating version dependencies according to an embodiment.

FIG. 6 schematically illustrates an example of management processes according to an embodiment.

FIGS. 8A, 8B, and 8C illustrate examples management requests in use cases involving instantiation of a network service.

FIG. 9 illustrates an example of a management request in a use case involving updating of a network service.

DETAILED DESCRIPTION

In the following, concepts in accordance with exemplary embodiments of the invention will be explained in more detail and with reference to the accompanying drawings. The illustrated embodiments relate to management of a network service provided in a communication network. The communication network may for example be a mobile communication network, e.g., as specified by 3GPP. However, the concepts could also be applied in other types of communication network.

In the illustrated concepts, for managing a network service (NS), a descriptor of the NS is supplemented with information on version dependency between two or more of its constituents. The constituents may include one or more descriptors of network functions (NFs). Such NF may be a virtual NF (VNF) or a physical NF (PNF). Other possible constituents of the descriptor are one or more descriptors of a nested NS. The nested NS corresponds to an NS which is invoked as part of the managed NS. The nested NS may be managed by another entity. When for example considering an NS managed by the NFV framework, the NSD of the NS may include one or more VNFDs, one or more PNFDs, and/or one or more NSDs of nested NSs. For at least one of these constituents different versions may exist. In such cases, the NSD may allow that the constituent identified in the NSD is substituted by another version, e.g., by including an ExtInvariantId attribute of the respective constituent. For example, if two VNFDs in the NSD have the same ExtInvariantId, this indicates external invariance of these VNFDs and that these VNFDs are allowed to be substituted by one another. In this way, it can be avoided that the NSD needs to be updated each time when one of its constituents is modified. Here, the information on version dependency may be used as an additional criterion when deciding on whether to accept the substitution. Specifically, the constituent to be substituted may have a certain version dependency with respect to another constituent. The version dependency can involve that the version of the constituent after substitution requires the presence of a certain version of the other constituent. The information on version dependency may be used to validate in an automated manner whether this requirement is met after the substitution. In another case, the version dependency can involve that another constituent requires the presence of a certain version of the constituent to be substituted. Also here, the information on version dependency may be used to validate in an automated manner whether this requirement is met after the substitution.

Figure 1:
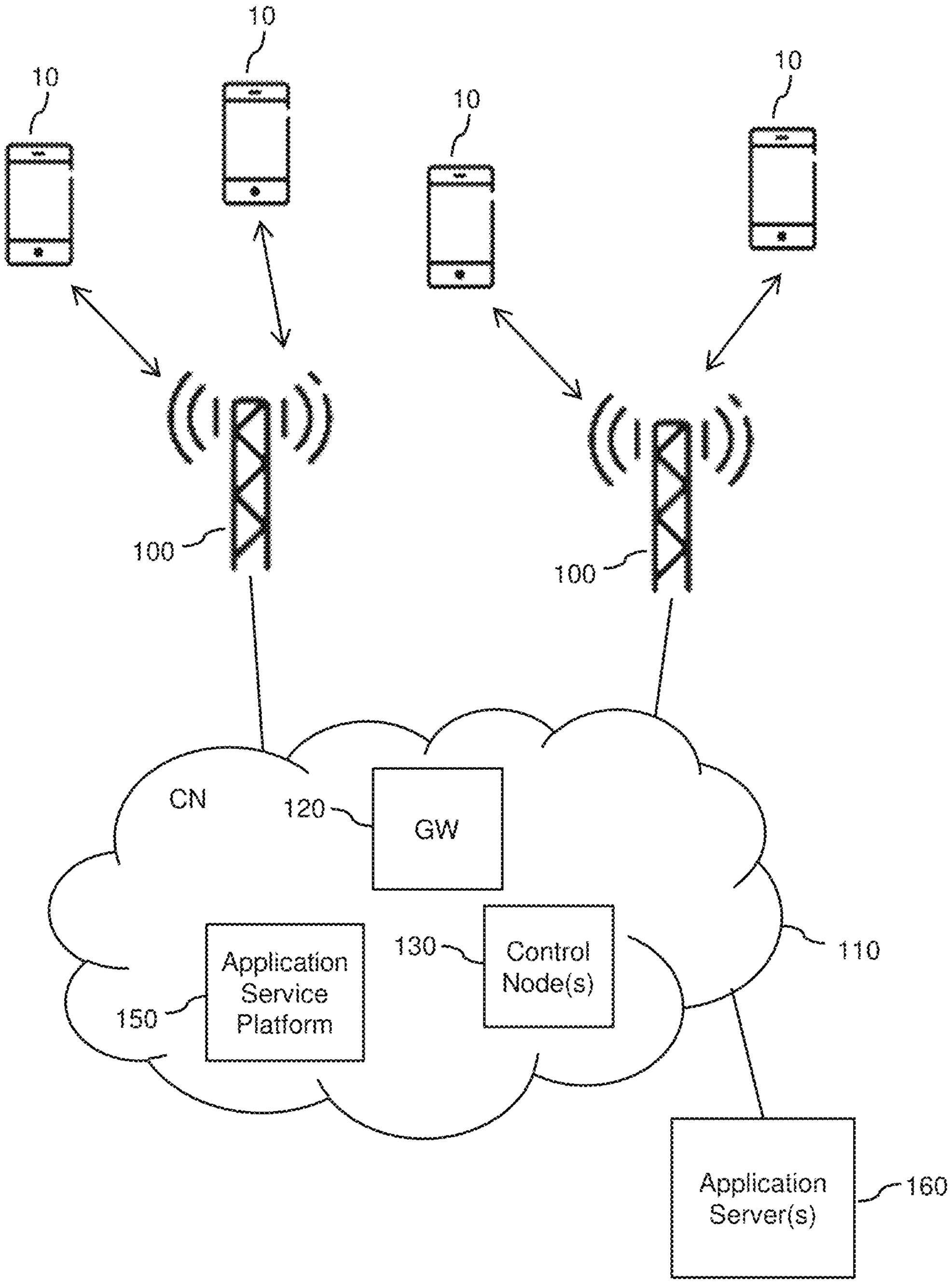
FIG. 1 schematically illustrates a communication network according to an embodiment.

FIG. 1 illustrates exemplary structures of the communication network, which in the illustrated example is assumed to be a wireless communication network as specified by 3GPP. In particular, FIG. 1 shows multiple UEs 10 which are served by access nodes 100 of the wireless communication network. Here, it is noted that each access node 100 may serve a number of cells within the coverage area of the wireless communication network. Depending on the supported RAT(s) each access nodes 100 may correspond to a gNB of the NR technology or an eNB of the LTE technology. The access nodes 100 may each be regarded as being part of an RAN of the wireless communication network. Further, FIG. 1 schematically illustrates a CN (Core Network) 110 of the wireless communication network. In FIG. 1, the CN 110 is illustrated as including a GW (gateway) 120 and one or more control node(s) 130. The GW 120 may be responsible for handling UP traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network.

Similarly, the network source may correspond to another UE 10, to an internal node of the wireless communication network, or to an external node which is connected to the wireless communication network. The control node(s) 130 may be used for controlling the user data traffic, e.g., by providing control data to the access node 100, the GW 120, and/or to the UE 10.

As illustrated by double-headed arrows, the access node 100 may send DL transmissions to the UEs, and the UEs may send UL transmissions to the access nodes 100. The DL transmissions and UL transmissions may be used to provide various kinds of services to the UEs, e.g., a voice service, a multimedia service, or a data service. Such services may be hosted in the CN 110, e.g., by a corresponding network node. By way of example, FIG. 1 illustrates an application service platform 150 provided in the CN 110. Further, such services may be hosted externally, e.g., by an AF (application function) connected to the CN 110. By way of example, FIG. 1 illustrates one or more application servers 160 connected to the CN 110. The application server(s) 160 could for example connect through the Internet or some other wide area communication network to the CN 110. The application service platform 150 may be based on a server or a cloud computing system and be hosted by one or more host computers. Similarly, the application server(s) 160 may be based on a server or a cloud computing system and be hosted by one or more host computers. The application server(s) 160 may include or be associated with one or more AFs that enable interaction with the CN 110 to provide one or more services to the UEs 10, corresponding to one or more applications. These services or applications may generate the user data traffic conveyed by the DL transmissions and/or the UL transmissions between the access node(s) 100 and the respective UE 10. Accordingly, the application server(s) 160 may include or correspond to the above-mentioned network destination and/or network source for the user data traffic. In the respective UE 10, such service may be based on an application (or shortly "app") which is executed on the UE 10. Such application may be pre-installed or installed by the user. Such application may generate at least a part of the UP traffic between the UE 10 and the access node 100.

In the illustrated concepts, at least some of the nodes illustrated in FIG. 1 may contribute to providing one or more NSs. Further, at least some of the functionalities of the illustrated nodes could be provided as an NS. For example, the CN 110 and/or the Application Servers 160 could at least in part be virtualized. Accordingly, a certain functionality of the GW 120, the control node(s) 150, the application service platform 150, and/or the application server(s) 160 could be implemented as an NS, which in turn may be based on one or more VNFs, one or more PNFs, and/or one or more nested NSs. Such nested NSs may in turn itself be based on one or more VNFs, one or more PNFs, and/or one or more NSs. The illustrated concepts may be utilized for efficiently managing such NS.

Figure 2:
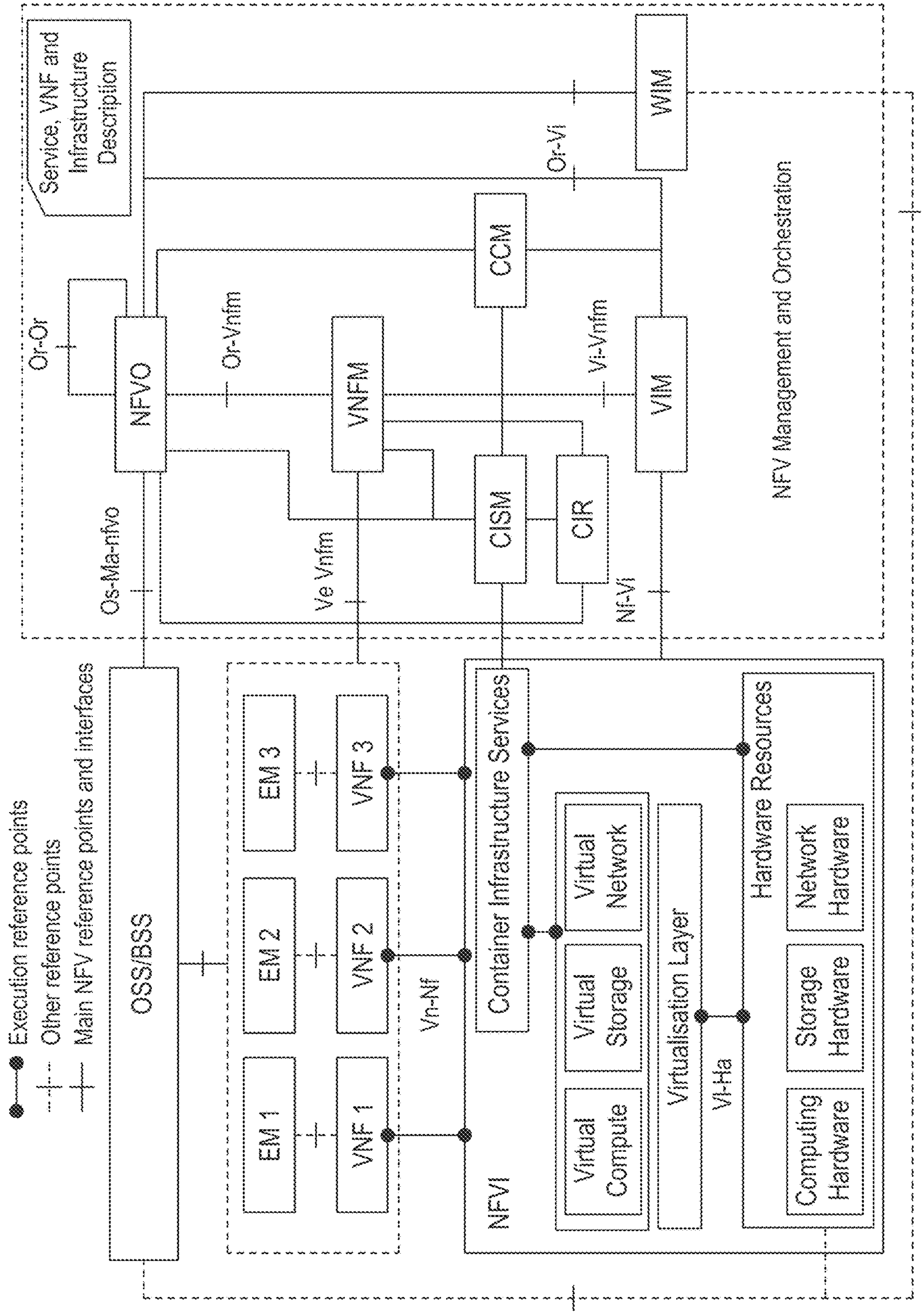
FIG. 2 schematically illustrates a management and orchestration architecture which may be used according to an embodiments.

In the following, the illustrated concepts will be explained in more detail, assuming that the NS is managed based on the NFV frame work, using an ETSI NFV-MANO architecture. FIG. 2, illustrates an example of such architecture. In this architecture an NFVO exposes an NSD management interface that allows consumers, e.g., OSS/BSS, to perform onboarding of NSDs and other management operations of NSs. The NFVO also exposes a VNF package interface that allows the consumers to perform onboarding of VNFDs. In the architecture of FIG. 2, these interfaces are implemented by the Os-Ma-nfvo reference point. A VNFM is responsible for LCM of VNFs and exposes a VNF LCM interface. In the architecture of FIG. 2, this interface is implemented by the Or-Vnfm reference point. Further details concerning the architecture elements illustrated in FIG. 2 can be implemented as defined in the ETSI NFV specifications, in particular V4.2.1 of ETSI GS NFV IFA 010, ETSI GS NFV-IFA 014, ETSI GS NFV-IFA 013, ETSI GS NFV-IFA 007, and ETSI GS NFV-SOL 001. The illustrated concepts may in particular involve functionalities of the NFVO, interaction of the NFVO with the OSS/BSS via the Os-Ma-nfvo reference point, and interaction of the NFVO with the VNFM via the Or-Vnfm reference point.

Figure 3:
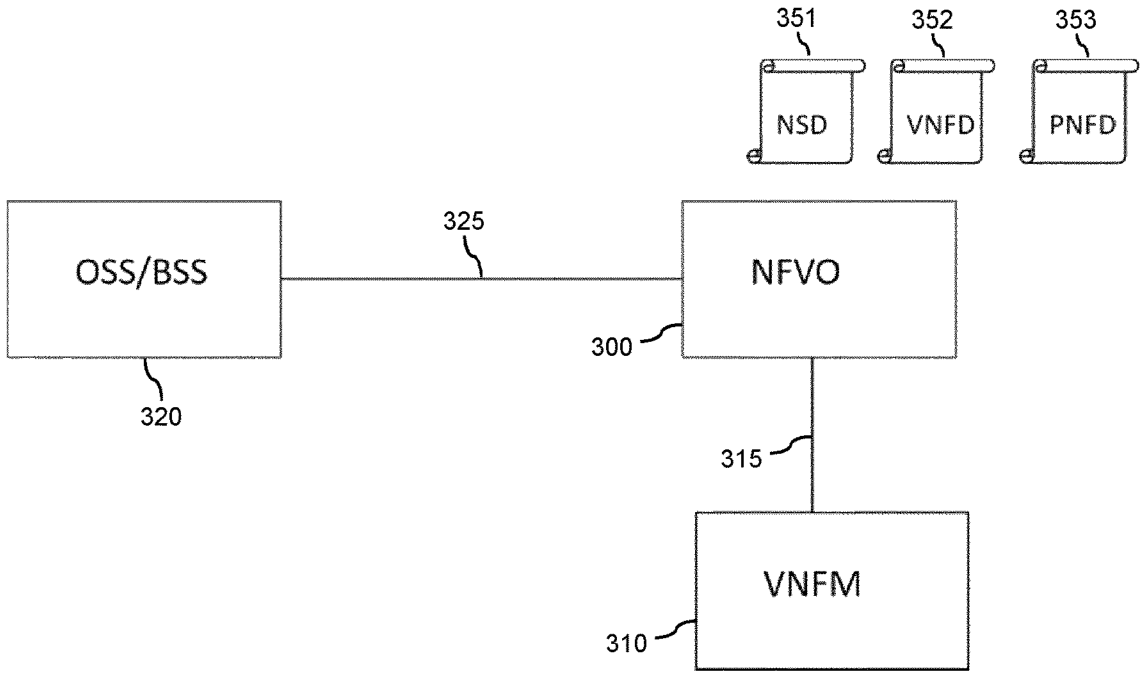
FIG. 3 schematically illustrates components interacting in management procedures according to an embodiment.

FIG. 3 further illustrates the entities that may participate in management procedures according to the illustrated concepts. In particular, FIG. 3 illustrates an NFVO 300, a VNFM 310, and an OSS/BSS 320. These entities may be part of an overall architecture as illustrated in FIG. 2. The NFVO and the VNFM communicate via an interface 315, which may correspond to the above-mentioned Or-Vnfm reference point. The NFVO and the OSS/BSS 320 communicate via an interface 325, which may correspond to the above-mentioned Os-Ma-nfvo reference point. The interface 315 supports signaling for VNF LCM procedures. The interface 325 supports signaling for NSD management procedures, VNF package management procedures, and NS LCM procedures. Further, FIG. 3 also illustrates a set of exemplary types of descriptors which may be used in the illustrated concepts, namely an NSD 351, a VNFD 352, and a PNFD 353.

In the illustrated concepts, an NSD may be supplemented with information about version dependencies between the constituents of the NSD. Further, the NS LCM interface, i.e., the interface 325, may be supplemented with functionalities enabling the consumer of the interface to provide overriding version dependencies to replace the version dependencies originally indicated in the NSD. The NFVO 300 may be enhanced by functionalities to ensure adherence to the version dependencies during the lifecycle of an NS instance. This may be achieved by controlling NS LCM operations depending on the version dependencies: When performing an NS LCM operation, the NFVO 300 may verify that the current version dependencies, which are typically the last version dependencies that were provided in an NS LCM operation as overriding version dependencies or the original version dependencies indicated in the NSD if overriding version dependencies have not been provided yet, would still be satisfied after the NS LCM operation. NS LCM operations that may result in the use of an NS constituent with a different version to the one indicated in the NSD include: instantiation of the NS, and update of the NS. The update of the NS may include the following sub-cases: adding an existing VNF instance to an NS instance, instantiating a new VNF instance and adding it to the NS instance, adding an existing NS instance as nested NS to the NS instance, moving an VNF instance from one NS instance to another NS instance, adding a PNF instance to the NS instance, and/or changing the current VNF package of a VNF instance.

Figure 4:
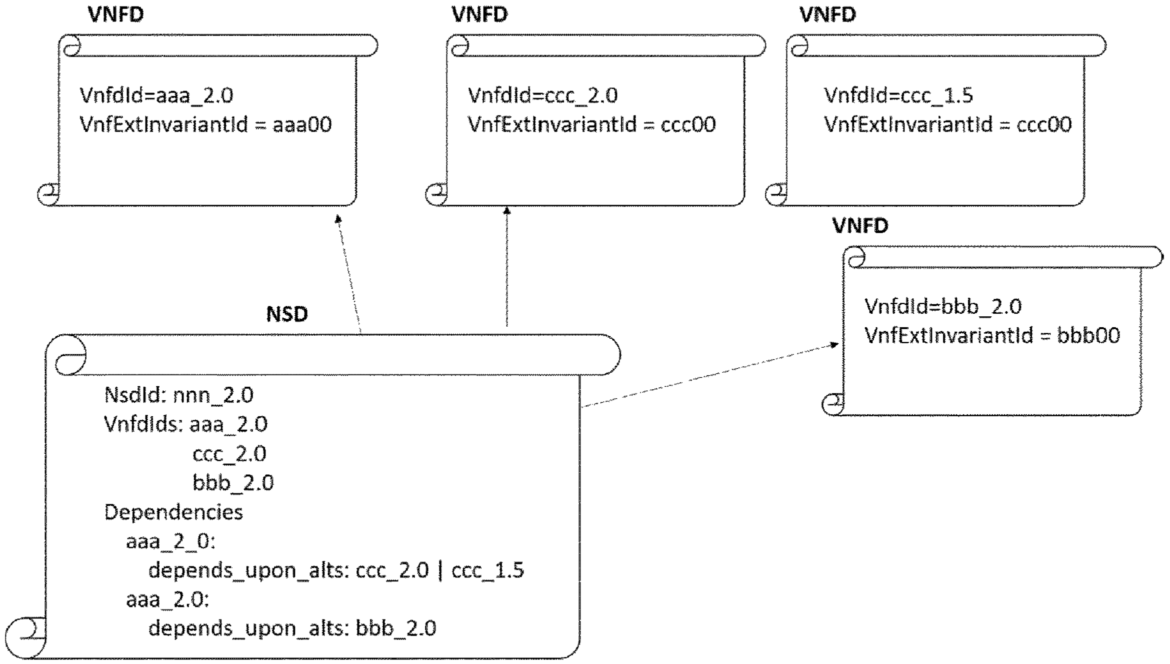
FIG. 4 schematically illustrates an example of a network service descriptor according to an embodiment.

FIG. 4 illustrates an example of an NSD in accordance with the illustrated concepts. In this example, the NSD has three constituent VNFDs, identified by "aaa_2.0", "bbb_2.0", and "ccc_2.0". The suffix "2.0" may be regarded as indicating the version of the respective constituent. The NSD incorporates its constituent VNFDs by including references to these VNFDs, in terms of VNFD identifiers. It is noted that in the NFV framework the reference to a VNFD in an NSD is inherently VNFD version specific, since different VNFD versions have different VNFD identifiers. In addition, FIG. 4 shows a further VNFD, identified by "ccc_1.5", which is however not referenced in the NSD. This further VNFD corresponds to another version of the VNFD with identifier ccc_2.0, namely version 1.5 as compared to version 2.0 of the VNFD referenced by the NSD.

As further illustrated, the VNFDs in the example of FIG. 4 also each include an ExtInvariantId attribute. The VNFD with identifier aaa_2.0 includes a VnfExtInvariantId set to "aaa00". The VNFD with identifier bbb_2.0 includes a VnfExtInvariantId set to "bbb00". The VNFD with identifier ccc_2.0 includes a VnfExtInvariantId set to "ccc00", which is the same VnfExtInvariantId as that of the VNFD with identifier ccc_1.5. Accordingly, from the perspective of external invariance, it would be allowed to use VNFD ccc_1.5 instead of VNFD ccc_2.0 in an NS instance which is based on the NSD, if such "overriding VNFD" is indicated in an NS LCM operation.

As further illustrated, the NSD in the example of FIG. 4 also includes an element denoted as "Dependencies". This element indicates the version dependency information of the illustrated concepts. In the illustrated example, the version dependency information indicates that the VNFD with identifier aaa_2.0 depends on alternatives corresponding to the VNFDs with identifiers ccc_2.0 and ccc_1.5. This means that VNFD with identifier aaa_2.0 requires the presence of either the VNFDs with identifiers ccc_2.0 or ccc_1.5 in the NS instance. Further, the version dependency information indicates that the VNFD with identifier aaa_2.0 depends on alternatives corresponding to the VNFDs with identifier bbb_2.0.

Examples of possible formats of indicating the version dependency information are illustrated in FIGS. 5A, 5B, and 5C. As illustrated in FIG. 5A, the version dependency information may be indicated by an information element of the NSD which is designated as "versionDependency". This information element includes a first attribute designated as "dependentConstituentId", which has a cardinality of 1 and identifies a dependent constituent in terms of its descriptor identifier. Further, the information element includes a second attribute designated as "versionDependencyStatement". FIG. 5B illustrates a possible format of the versionDependencyStatement information element. In this example, the versionDependencyStatement element has a cardinality corresponding to the number of other descriptors on which the dependent constituent depends, which are each identified in terms of their descriptor identifier, indicated by an attribute denoted as "descriptorId". The version dependency statement, thus identifies a VNFD, NSD or PNFD upon which the dependent constituent depends. When more than one other descriptor identifiers are present in the version dependency statement, the descriptor identifiers are regarded as corresponding to versions of the same VNF, NS or PNF and they represent alternatives, i.e., the presence of one of them fulfills the dependency. Accordingly, if multiple other descriptors are present they are to be validated in terms of a logical OR combination. If multiple versionDependencyStatement attributes are present in the versionDependency information element, these are to be validated in terms of a logical AND combination, i.e., all version dependency statements need to be fulfilled.

It is noted that in the example of FIG. 5A, the version dependency information can be provided for various constituent types of the NSD, e.g., VNFDs, PNFDs and/or nested NSDs. Accordingly, the version dependency information element could indicate dependency of a dependent VNFD on one or more other VNFDs, dependency of a dependent PNFD on one or more other PNFDs, or dependency of a dependent nested NS on one or more other nested NSs. Further, the version dependency information element can also indicate a dependency on another type of constituent. For example, the version dependency information element of a dependent VNFD could indicate dependency of the dependent VNFD on one or more PNFDs and/or one or more nested NSDs. Similarly, the version dependency information element of a dependent PNFD could indicate dependency of the dependent PNFD on one or more VNFDs and/or one or more nested NSDs. Further, the version dependency information element of a dependent VNFD could indicate dependency of the dependent nested NSD on one or more VNFDs and/or one or more PNFDs. Accordingly, the format of the version dependency information element may be regarded as indicating a dependent descriptor in terms of its identifier and one or more other descriptors, on which the dependent constituent depends, in terms of their respective identifiers. The dependent descriptor and the other descriptors may correspond to different constituent types, e.g., may each be a VNFD, PNFD, or nested NSD.

FIG. 5C shows an example of how the information on version dependency may be indicated as part of a profile of a VNF, PNF, or nested NS. In this case, an information element of the NSD which defines a VNF profile, a PNF profile, or a nested NS profile may be supplemented by a respective attribute, denoted as "versionDependency" which indicates version dependency information for the respective VNF, PNF, or nested NS. The version dependency information may be provided in an information element as explained in connection with FIG. 5A. If a VNF profile references a certain VNFD, the information on version dependency indicated by the versionDependency attribute may also apply to other versions of the VNFD which have the same VndExtInvariantId. If a PNF profile references a certain PNFD, the information on version dependency indicated by the versionDependency attribute may also apply to other versions of the PNFD which have the same PnfdExtInvariantId. If a nested NS profile references a certain nested NSD, the information on version dependency indicated by the versionDependency attribute may also apply to other versions of the nested NSD which have the same nsdExtInvariantId.

FIG. 6 shows an example of processes in accordance with the illustrated concepts. The processes of FIG. 6 involve the NFVO 300, the VNFM 310, and the OSS/BSS 320.

In the processes of FIG. 6, the OSS/BSS 320 sends a message 601 for onboarding of a VNF package. The message 601 includes a definition of a VNF package. The VNF package includes VNFDs which are potential constituents of NSDs. For example, such VNF package could include the VNFDs illustrated in FIG. 4, i.e., the VNFD identified by aaa_2.0, the VNFD identified by bbb_2.0, and the VNFD identified by ccc_2.0, but also the VNFD identified by ccc_1.5.

The OSS/BSS 320 then sends a further message 602 for onboarding an NSD. The message 602 includes a definition of a NSD, such as the NSD illustrated in FIG. 4. The NSD has multiple constituents, which may be VNFDs, PNFDs, or nested NSDs. In the example of FIG. 6, it is assumed that the NSD includes VNFDs defined by the VNF package onboarded by message 601.

The OSS/BSS 320 then sends a further message 603 for invoking an NS LCM operation. The message 603 has the form of a request and is thus termed as an "NS LCM operation request", and the NFVO 300 is responsible on deciding whether to accept the request. The requested LCM operation can be of various types and for example include instantiation of an NS instance based on the NSD or updating of the NS. The NS LCM operation request may include an overriding descriptor identifier, e.g., an identifier of a VNFD, PNFD, or nested NSD which is intended to substitute a particular constituent of the NSD, which has the same ExtInvariantId as the descriptor identified by the overriding descriptor identifier. If the requested LCM operation corresponds to a change of the current VNF package, such overriding descriptor identifier is typically not present. However, also the request for changing the current VNF package would include at least one VNFD identifier which identifies a VNFD that is subject to the requested change.

In some case, the message 603 may also include information indicating overriding information on version dependencies, that shall replace at least a part of the information on version dependency included in the NSD.

As indicated by block 604, the NFVO 300 then validates if the requested substitution of the constituent complies with the information on version dependency included in the NSD or, if applicable, with the overriding information on version dependency included in the message 603. For this purpose, the NFVO 300 may first check compliance of the substitution with the overriding version dependencies indicated in the message 603. If no overriding version dependency was indicated in the message 603, the NFVO 300 may continue by checking if the substitution complies with earlier indicated overriding version dependencies, if no such earlier overriding version dependency is present, eventually check compliance with the version dependencies originally specified in the NSD.

In the example of FIG. 6, it is assumed that the requested substitution complies with the available information on version dependency. The NFVO thus decides to accept the request of message 603 and proceeds by requesting a corresponding VNF LCM operation by the VNFM 310, as indicated by message 605. The VNF LCM operation may for example result in replacing a VNF instance with another VNF instance, with the other VNF instance corresponding to the substituted version of the VNFD.

Figure 7:
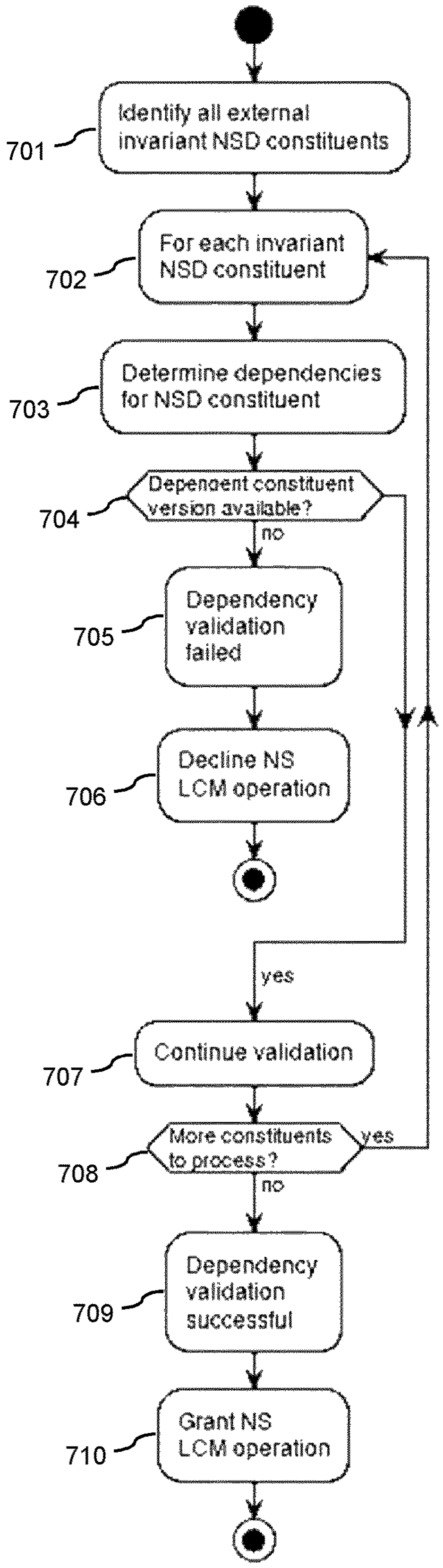
FIG. 7 shows a flowchart for illustrating a management procedure according to an embodiment.

FIG. 7 shows a flowchart for illustrating a procedure for validating an NS LCM operation request based on the information on version dependency. The procedure of FIG. 7 could for example be applied in block 604 of FIG. 6.

At 701, the NFVO 300 identifies the NSD constituents which have external invariance, by checking the presence of an ExtInvariantId attribute in the respective descriptors. As indicated by 702, then NFVO 300 then continues with the following operations for each NSD constituent having external invariance: determining the version dependencies of the NSD constituent and determining the version dependencies of other NSD constituents upon this NSD constituent, as indicated by 703, and checking if a dependent version of the NSD constituent is available, as indicated by 704. Here, it is noted that in this check the availability of a dependent version of the NSD constituent means that there is another version of the NSD constituent available, which has the same ExtInvariantId and complies with the version dependencies of the NSD constituent as indicated by the available, overriding or original, information on version dependency. If this is not the case, the NFVO 300 declares the validation of version dependency as failed, as indicated by 705. In response to the failed validation, the NFVO 300 declines the requested LCM operation, as indicated by 706.

If at 704 a dependent version of the NSD constituent is found to be available, the NFVO 300 continues the validation, as indicated by 707. If there are more NSD constituents having external invariance to check, as indicated by 708, the NFVO 300 returns to 702 to check the dependencies of the next NSD constituent. Otherwise, if there are no more NSD constituents to check, the NFVO 300 proceeds by declaring the validation as successful, as indicated by 709. In response to the successful validation, the NFVO 300 grants the requested LCM operation, as indicated by 710.

Based on the above principles, and when assuming an NSD and VNFDs as illustrated in FIG. 4, exemplary use cases corresponding to NS LCM operation requests schematically illustrated by FIGS. 8A, 8B, 8C, and 9 could be handled.

In the example of FIG. 8A, the requested NS LCM operation involves instantiation of the NS, with the NS LCM operation request indicating an overriding VNFD for the VNFD with identifier ccc_2.0. The overriding VNFD, with identifier ccc_1.1, is indicated by a parameter denoted as "overridingVnfdId", which is part of a parameter set denoted as "additionalParamForVnf". It is noted that this parameter set also includes a parameter denoted as "vnfProfileId" (not illustrated) that allows to identify the VNFD to which the overridingVnfdId parameter refers, in this case the VNFD with identifier ccc_2.0. If the VNFDs with identifier ccc_2.0 and ccc_1.1 have the same VnfExtInvariantId, the requested substation of VNFD ccc_2.0 with VNFD ccc_1.1 would be allowable from the perspective of external invariance. However, the version of VNFD ccc_1.1 does not fulfill the version dependencies of aaa_2.0 indicated in the NSD, because VNFD aaa_2.0 depends on the presence of VNFD ccc_2.0 or VNFD ccc_1.5 in the NSD and this requirement is not met by VNFD ccc_1.1. As a result, the requested instantiation is not allowed by the NFVO 300.

In the example of FIG. 8B, the requested NS LCM operation involves instantiation of the NS, with the NS LCM operation request indicating an overriding VNFD for the VNFD with identifier ccc_2.0 and overriding version dependency information. The overriding VNFD, with identifier ccc_3.0, is indicated by a parameter denoted as "overridingVnfdId", which is part of a parameter set denoted as "additionalParamForVnf". It is noted that the parameter set additionalParamForVnf also includes a parameter denoted as "vnfProfileId" (not illustrated) that allows to identify the VNFD to which the overriding overridingVnfdId parameter refers, in this case the VNFD with identifier ccc_2.0.

The overriding version dependency information is indicated by an information element of the parameter set additionalParamForVnf, which is denoted as "overridingVersionDependency". The overridingVersionDependency information element includes an information element denoted as "versionDependency" and a profileId indicating where this overridingDependency a VNF profile to which the overriding version dependency information applies, i.e., where shall replace an existing version dependency or is to be added to one or more existing version dependencies. It is noted that this profileId may be different from the vnfProfileId indicated in the additionalParamForVnf. The overriding version dependency information indicates that VNFD aaa_2.0 depends on VNFD ccc_2.0, VNFD ccc_1.5, and VNFD ccc_3.0, and that VNFD aaa_2.0 depends on VNFD bbb_2.0. Accordingly, the overriding version dependency information adds a dependency of VNFD aaa_2.0 on VNFD ccc_3.0 to the information on version dependency originally included in the NSD. If the VNFDs with identifier ccc_3.0 and ccc_2.0 have the same VnfExtInvariantId, the requested substation of VNFD ccc_2.0 with VNFD ccc_3.0 would be allowable from the perspective of external invariance. However, the version of VNFD ccc_3.0 does not fulfill the version dependencies of aaa_2.0 indicated in the NSD, because VNFD aaa_2.0 depends on the presence of VNFD ccc_2.0 or VNFD ccc_1.5 in the NSD and this requirement is not met by VNFD ccc_3.0. On the other hand, since the overriding information on version dependency also indicates a dependency of VNDF aaa_2.0 on VNDF ccc_3.0 and the overriding information on version dependency is used with precedence, the requested instantiation complies with the version dependency requirements and is allowed by the NFVO 300.

In the example of FIG. 8C, the requested LCM operation involves instantiation of the NS, with the NS LCM operation request indicating a first overriding VNFD for the VNFD with identifier ccc_2.0, a second overriding VNFD for the VNFD with identifier ccc_2.0, and overriding version dependency information. The first overriding VNFD, with identifier aaa_3.0, is indicated by a first parameter denoted as “overridingVnfdId”, which is part of a first parameter set denoted as “additionalParamForVnf”. It is noted that the first parameter set additionalParamForVnf also includes a parameter denoted as “vnfProfileId” (not illustrated) that allows to identify the VNFD to which the first overridingVnfdId parameter refers, in this case the VNFD with identifier aaa_2.0. The second overriding VNFD, with identifier ccc_3.0, is indicated by a second parameter denoted as “overridingVnfdId”, which is part of a second parameter set denoted as “additionalParamForVnf”. It is noted that the second parameter set additionalParamForVnf also includes a parameter denoted as “vnfProfileId” (not illustrated) that allows to identify the VNFD to which the second overridingVnfdId parameter refers, in this case the VNFD with identifier ccc_2.0.

The overriding version dependency information is indicated by information elements of the parameter set additionalParamForVnf, which are denoted as “overridingVersionDependency”. The overridingVersionDependency information element includes an information element denoted as “versionDependency” and a profileId indicating where this overridingDependency a VNF profile to which the overriding version dependency information applies, i.e., where shall replace an existing version dependency or is to be added to one or more existing version dependencies. It is noted that this profileId may be different from the vnfProfileId indicated in the additionalParamForVnf. The overriding version dependency information indicates that VNFD aaa_3.0 depends on VNFD ccc_2.0, VNFD ccc_1.5, and VNFD ccc_3.0, that VNFD aaa_3.0 depends on VNFD bbb_2.0, that VNFD aaa_2.0 depends on VNFD ccc_2.0, VNFD ccc_1.5, and VNFD ccc_3.0, and that VNFD aaa_2.0 depends on VNFD bbb_2.0. Accordingly, the overriding version dependency information adds a dependency of VNFD aaa_3.0 on VNFD ccc_2.0, VNFD ccc_1.5, VNFD ccc_3.0, and VNFD bbb_2.0, and a dependency of VNDF aaa_2.0 on VNDF ccc_3.0 to the information on version dependency originally included in the NSD. If the VNFDs with identifier aaa_3.0 and aaa_2.0 have the same VnfExtInvariantId, the requested substation of VNFD aaa_2.0 with VNFD aaa_3.0 would be allowable from the perspective of external invariance. Similarly, if the VNFDs with identifier ccc_3.0 and ccc_2.0 have the same VnfExtInvariantId, the requested substation of VNFD ccc_2.0 with VNFD ccc_3.0 would be allowable from the perspective of external invariance. Further, since the overriding information on version dependency also indicates dependency of VNDF aaa_3.0 on VNDF ccc_3.0 and the overriding information on version dependency is used with precedence, the requested instantiation complies with the version dependency requirements and is allowed by the NFVO 300. It is noted that in the example of FIG. 8C the overriding information on version dependency maintains the version dependencies of VNFD aaa_2.0 as originally indicated in the NSD, even though VNFD aaa_2.0 is being replaced by VNFD aaa_3.0, with the addition of a further version dependency on VNDF ccc_3.0. Maintaining the information related to the replaced VNFD may be useful if in a future NS LCM operation VNFD aaa_3.0 is for some reason re-substituted by VNFD aaa_2.0.

In the example of FIG. 9, it assumed that the NS was already instantiated according to the original NSD, and that NS LCM operation request is directed to an update of the NS with change of the VNF package. The VNF package data to be changed is indicated by a parameter denoted as “changeVnfPackagedata”, which includes an identifier of a VNF instance to which the change refers an identifier of a new VNFD to be introduced to the package, namely VNFD ccc_3.0. In the illustrated example, the update thus involves changing the VNFD ccc_2.0 to VNFD ccc_3.0. Further, the LCM operation request includes overriding version dependency information.

The overriding version dependency information is indicated by an information element denoted as “overridingVersionDependency”. The overriding version dependency information indicates that VNFD aaa_2.0 depends on VNFD ccc_2.0, VNFD ccc_1.5, and VNFD ccc_3.0, and that VNFD aaa_2.0 depends on VNFD bbb_2.0. Accordingly, the overriding version dependency information adds a dependency of VNFD aaa_2.0 on VNFD ccc_3.0 to the information on version dependency originally included in the NSD. If the VNFDs with identifier ccc_3.0 and ccc_2.0 have the same VnfExtInvariantId, the requested substitution of VNFD ccc_2.0 with VNFD ccc_3.0 would be allowable from the perspective of external invariance. However, the version of VNFD ccc_3.0, which is introduced by the requested update of the VNF package, does not fulfill the version dependencies of aaa_2.0 indicated in the NSD, because VNFD aaa_2.0 depends on the presence of VNFD ccc_2.0 or VNFD ccc_1.5 in the NSD and this requirement is not met by VNFD ccc_3.0. On the other hand, since the overriding information on version dependency also indicates a dependency of VNDF aaa_2.0 on VNDF ccc_3.0 and the overriding information on version dependency is used with precedence, the requested instantiation complies with the version dependency requirements and is allowed by the NFVO 300.

In the illustrated examples, the NFVO 300 thus supports a capability to process information on version dependency between NSD constituents. Such information may be provided as part of an NSD defined via the interface 325. Further, such information on version dependency may be provided via the interface 325, together with an LCM operation request and may then have precedence over the information on version dependency included in the NSD. The NFVO may apply the information on version dependency when executing NS LCM operations that create other instances of the NSD constituents subject to the version dependency or add one or more further constituents to the NS instance, which are subject to the version dependency. As a result, it can be avoided to change the NSD itself if a different descriptor version or different version dependency information for one or more of the NSD constituents is to be used for an NS instance. The interface 325, which as mentioned above may be based on the Os-Ma-nfvo reference point, may thus support providing information on version dependency between NSD constituents. This information may be used to override the version dependencies indicated in the NSD when these constituents are instantiated or added to the NS. When it affects new instances of VNFs, nested NSs or PNFs, the descriptor and version dependency referred via the interface 325 will be used for the instantiation. When it affects existing instances of VNFs and nested NSs to be included in the NS, these instances should comply with the descriptors and version dependencies indicated via the interface 325.

It is noted that the information element for indicating the overriding version dependency information in the above examples may itself be provided as part of different types of other information element, depending on the considered NSD constituent and depending on the type of NS LCM operation being requested. For example, the overridingVersionDependency information element could be part of an information element denoted as "VnfInstanceData", which specifies existing VNF instances to be used in an NS instance, part of an information element denoted as "ParamsForVnf", which specifies additional parameters for an NS instance on a per VNF basis, part of an information element denoted as "InstantiateVnfData", which specifies parameters that are needed for VNF instantiation when the OSS/BSS explicitly requests VNF instantiation for a given NS, part of an information element denoted as "NestedNsInstanceData" which specifies an existing nested NS instance to be used in the NS instance, additional parameters on a per nested NS instance basis "ParamsForNestedNs", which specifies additional parameters on a per nested NS instance basis, part of an information element denoted as "AddPnfData", which provides input information about PNF which needs to be added into an NS instance, or part of an information element denoted as "ChangeVnfPkgData", which specifies changes of VNF package data, like in the example of FIG. 9. The overridingVersionDependency information element may refer to a profile of a VNF, PNF, or NS, in which the indicated version dependency shall overrides an existing version dependency or is to be added to the existing version dependencies. If the referenced profile contains a versionDependency information element with a dependentConstituent equal to the one indicated in the versionDependency attribute of the overridingVersionDependency information element, the versionDependency of the overridingVersionDependency information element overrides the one in the profile, otherwise it is added to the version dependencies in the profile. The overridingVersionDependency information element may indicate the overriding version dependency information by including a versionDependency information element having a structure as explained in connection with FIG. 5A.

Figure 10:
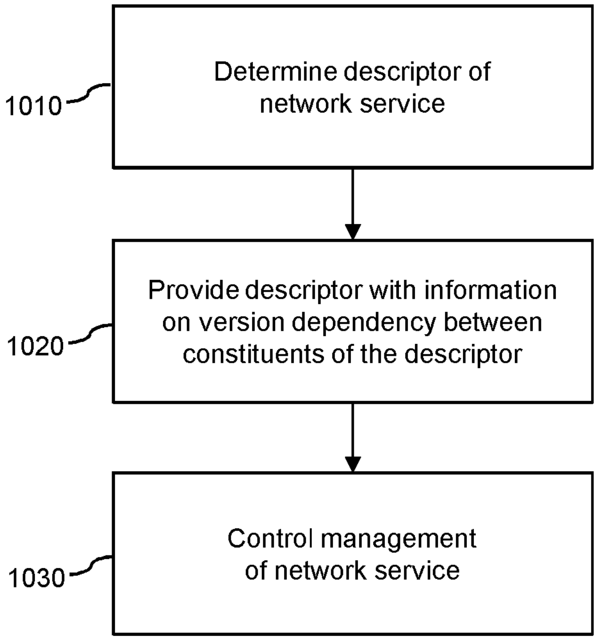
FIG. 10 shows a flowchart for schematically illustrating a method according to an embodiment of the invention.

FIG. 10 shows a flowchart for illustrating a method, which may be utilized for implementing the illustrated concepts. The method of FIG. 10 may be used for implementing the illustrated concepts in a node of a communication network, e.g., corresponding to the above-mentioned NFVO 300.

If a processor-based implementation of the node is used, at least some of the steps of the method of FIG. 10 may be performed and/or controlled by one or more processors of the node. Such node may also include a memory storing program code for implementing at least some of the below described functionalities or steps of the method of FIG. 10.

At step 1010, a descriptor of a network service is determined. The descriptor includes multiple constituents. The constituents of the descriptor may include at least one descriptor of a virtual network function for implementing the network service, such as the above-mentioned VNFDs. Alternatively or in addition, the constituents of the descriptor may include at least one descriptor of a physical network function for implementing the network service, such as the above-mentioned PNFDs. Alternatively or in addition, the constituents of the descriptor may include at least one descriptor of a nested network service for implementing the network service, such as the above-mentioned nested NSDs. In some scenarios, the descriptor of the network service further includes information identifying one or more of the constituents which are allowed to be replaced with another version of the same constituent. The above-mentioned ExtInvariantId attributes are examples of such information.

At step 1020, the descriptor is provided with information on version dependency between at least two of the multiple constituents. The information on version dependency may identify one or more of the constituents of the descriptor, respectively for each of the identified constituents, indicate one or more versions of at least one other of the constituents on which the identified constituent depends. Example formats of indicating such information on version dependency are illustrated in FIGS. 5A, 5B, and 5C. In some scenarios, at least a part of the information on the version dependency may be received via a network service management interface, such as the above-mentioned interface 325.

At step 1030, management of the network service may be controlled depending on the information on the version dependency. The management controlled at step 1030 may include receiving a request for management of the network service and, depending on the information on version dependency, deciding whether to accept the request. Examples of such requests are the above-mentioned NS LCM requests. The management of the network service may include instantiating the network service. Further, the management of the network service may include updating the network service. Such updating of the network service may involve replacing one of the constituents of the descriptor of the network service with another version of the same constituent. Further, such updating of the network service comprises removing one of the constituents from the descriptor of the network service. Further, such updating of the network service may include adding a new constituent to the descriptor of the network service. In some scenarios, the management of the network service may include modifying the information on version dependency, such as explained above for the overriding information on version dependency.

Figure 11:
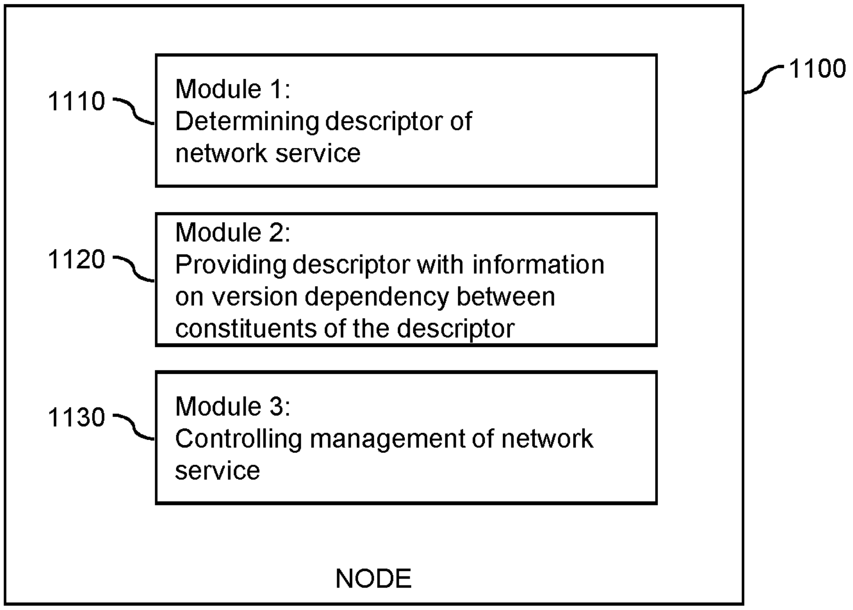
FIG. 11 shows an exemplary block diagram for illustrating functionalities of a network node implementing functionalities corresponding to the method of FIG. 10.

FIG. 11 shows a block diagram for illustrating functionalities of a node 1100 for a communication network which operates according to the method of FIG. 10. The node 1100 may for example correspond to or implement the above-mentioned NFVO 300. As illustrated, the node 1100 may be provided with a module 1110 configured to determine a descriptor of a network service, such as explained in connection with step 1010. Further, the node 1100 may be provided with a module 1120 configured to provide the descriptor with information on version dependency of constituents, such as explained in connection with step 1020. Further, the node 1100 may be provided with a module 1130 configured to control management of the network service, such as explained in connection with step 1030.

It is noted that the node 1100 may include further modules for implementing other functionalities, such as known functionalities of an NFVO of the ETSI NFV framework or management node. Further, it is noted that the modules of the node 1100 do not necessarily represent a hardware structure of the node 1100, but may also correspond to functional elements, e.g., implemented by hardware, software, or a combination thereof.

Figure 12:
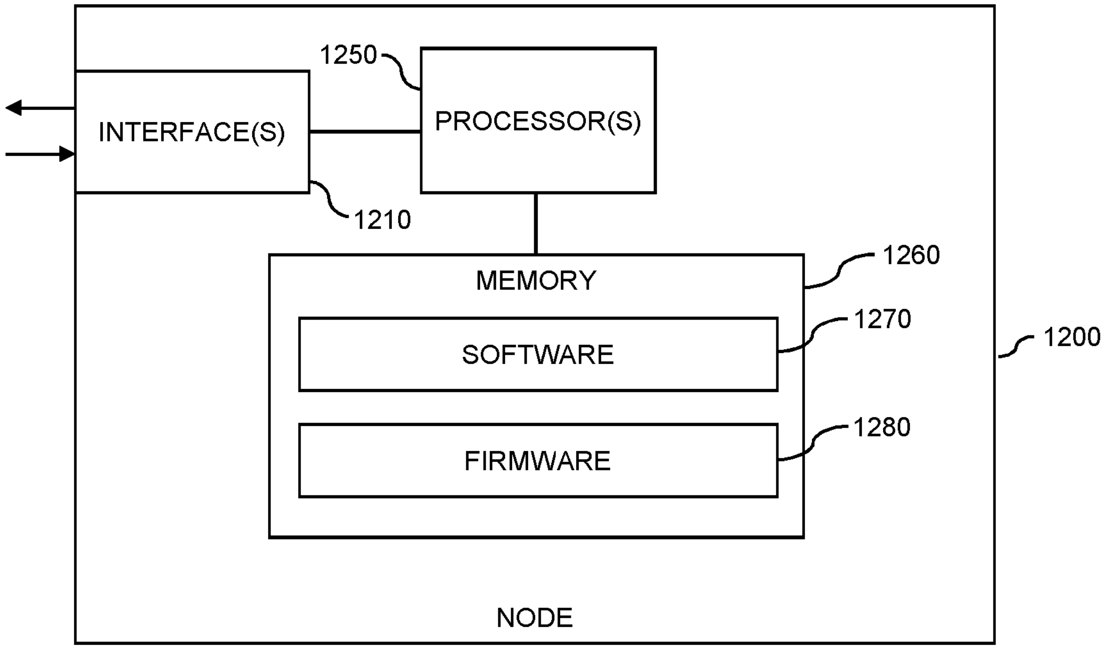
FIG. 12 schematically illustrates structures of a network node according to an embodiment of the invention.

FIG. 12 schematically illustrates a processor-based implementation of a node 1200 for a communication network, which may be used for implementing the above-described concepts. For example, the structures as illustrated in FIG. 12 may be used for implementing the concepts in the above-mentioned NFVO 300 or similar management node.

As illustrated, the node 1200 may include one or more interfaces 1210. The interface(s) 1210 may be used for communication with one or more other nodes of the communication network, such as the above-mentioned VNFM 310 or OSS/BSS 320.

Further, the node 1200 may include one or more processors 1250 coupled to the interface(s) 1210 and a memory 1260 coupled to the processor(s) 1250. By way of example, the interface(s) 1210, the processor(s) 1250, and the memory 1260 could be coupled by one or more internal bus systems of the node 1200. The memory 1260 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for managing a network service, such as explained in connection with FIG. 10.

It is to be understood that the structures as illustrated in FIG. 12 are merely schematic and that the node 1200 may actually include further components which, for the sake of clarity, have not been illustrated, e.g., further interfaces or further processors. Also, it is to be understood that the memory 1260 may include further program code for implementing known functionalities of a NFVO or similar management node. According to some embodiments, also a computer program may be provided for implementing functionalities of the node 1200, e.g., in the form of a physical medium storing the program code and/or other data to be stored in the memory 1260 or by making the program code available for download or by streaming.

As can be seen, the concepts as described above may be used for efficiently managing a network service which is provided by cooperation of multiple network functions, such as VNFs or PNFs. In particular, a NSD of the network service may be supplemented with information on version dependency among constituents of the NSD. In this way, substitution of a constituent with another version may be enabled while at the same time avoiding a risk of no longer matching version dependencies. Risks of version incompatibilities that may arise during the life cycle of an NS instance if different versions of some constituent descriptors are used instead of the ones indicated in the NSD may thus be eliminated or at least significantly reduced. Further, functionalities allowing substitution of NSD constituents like provided by the ExtInvariantId attribute may be exploited in an efficient and safe manner. This may also help to support Continuous Integration (CI) and Continuous Delivery or Deployment (CD). The illustrated concepts may help to supports automation of software upgrade and/or update processes, by enabling the management and orchestration system to detect any version incompatibilities during a software upgrade or update. In the case of an error during the upgrade or update process, the claimed solution may also help to determine compatible versions that can be used in a rollback.

It is to be understood that the examples and embodiments as explained above are merely illustrative and susceptible to various modifications. For example, the illustrated concepts may be applied in connection with various kinds of communication technologies, without limitation to wireless technologies or a technology specified by 3GPP. Further, the concepts may be applied with respect to various types network services. Further, the concepts are not limited to the ETSI NFV framework, but could also be applied in other management and orchestration technologies, such as ONAP or O-RAN. It is noted that in such other technologies the above-mentioned entities, interfaces, and information elements may be designated in a different manner. Moreover, it is to be understood that the above concepts may be implemented by using correspondingly designed software to be executed by one or more processors of an existing device or apparatus, or by using dedicated device hardware. Further, it should be noted that the illustrated nodes, apparatuses or devices may each be implemented as a single device or as a system of multiple interacting devices or modules, e.g., based on virtualized cloud components.

The invention claimed is:

1. A method of managing a network service in a communication network based on a Network Functions Virtualization (NFV) framework, wherein the method is performed by an NFV Orchestrator (NFVO), the method comprising:
- receiving a descriptor of a network service, the descriptor of the network service comprising multiple constituents corresponding to a plurality of network function descriptors, wherein
- the network service descriptor is provided with information on version dependency between at least two of the multiple constituents and the information on version dependency identifies one or more of the constituents and, respectively for each of the identified constituents, indicates one or more versions of at least one other of the constituents on which the identified constituent depends;
- receiving a request for management of the network service; and
- determining, based on the information on the version dependency, whether to accept the request for management.

2. The method according to claim 1, comprising:
- depending on the information on the version dependency, controlling management of the network service.

3. The method according to claim 2,
- wherein said management of the network service comprises instantiating the network service.

4. The method according to claim 2,
- wherein said management of the network service comprises updating the network service.

5. The method according to claim 4,
- wherein said updating of the network service comprises replacing one of the constituents of the network service descriptor with another version of the same constituent.

6. The method according to claim 4,
- wherein said updating of the network service comprises removing one of the constituents from the network service descriptor.

7. The method according to claim 4,
- wherein said updating of the network service comprises adding a Previously Presented constituent to the network service descriptor.

8. The method according to claim 2,
- wherein said management of the network service comprises modifying the information on version dependency.

9. The method according to claim 1, wherein the network service descriptor further comprises information identifying one or more of the constituents which are allowed to be replaced with another version of the same constituent.

10. The method according to claim 1, further comprising: receiving at least a part of the information on the version dependency via a network service management interface.

11. The method according to claim 1, wherein the constituents of the network service descriptor comprise at least one descriptor of a virtual network function for implementing the network service.

12. The method according to claim 1, wherein the constituents of the network service descriptor comprise at least one descriptor of a physical network function for implementing the network service.

13. The method according to claim 1, wherein the constituents of the network service descriptor comprise at least one descriptor of a nested network service for implementing the network service.

14. A node for a communication network based on a Network Functions Virtualization (NFV) framework, wherein the node is an NFV Orchestrator (NFVO), the node being configured to:

receive a descriptor of a network service, the descriptor of the network service comprising multiple constituents corresponding to a plurality of network function descriptors, wherein the network service descriptor is provided with information on version dependency between at least two of the multiple constituents and the information on version dependency identifies one or more of the constituents and, respectively for each of the identified constituents, indicates one or more versions of at least one other of the constituents on which the identified constituent depends;

receive a request for management of the network service; and determine, based on the information on the version dependency, whether to accept the request for management.

15. A computer program product comprising a non-transitory computer readable medium storing a computer program comprising program code to be executed by at least one processor of a node of a communication network based on a Network Functions Virtualization (NFV) framework, whereby execution of the program code causes the node to perform a method according to claim 1.

* * * * *